United States Patent [19]
Hannum

[11] Patent Number: 5,295,917
[45] Date of Patent: Mar. 22, 1994

[54] SPLIT SPROCKET WITH QUICK LOCKING MECHANISM

[75] Inventor: Joseph R. Hannum, Blue Bell, Pa.

[73] Assignee: The Budd Company, Troy, Mich.

[21] Appl. No.: 1,464

[22] Filed: Jan. 7, 1993

[51] Int. Cl.$^5$ .......................................... F16H 55/46
[52] U.S. Cl. .................................................... 474/95
[58] Field of Search ................................. 474/95–97

[56] References Cited

U.S. PATENT DOCUMENTS

| | | |
|---|---|---|
| 1,359,822 | 11/1920 | Misener . |
| 2,465,570 | 3/1949 | Bocchino . |
| 3,106,101 | 10/1963 | Harriman . |
| 4,631,974 | 12/1986 | Wiegand et al. . |
| 4,790,554 | 12/1988 | Siegwart, Jr. . |
| 4,861,321 | 8/1989 | Siegwart, Jr. . |
| 5,035,681 | 7/1991 | Hertel et al. . |
| 5,037,356 | 8/1991 | Gladczak et al. ................. 474/95 |
| 5,057,058 | 10/1991 | Crudyp .............................. 474/95 |
| 5,158,505 | 10/1992 | Woyach ............................. 474/95 |

*Primary Examiner*—Thuy M. Bui
*Attorney, Agent, or Firm*—Harness, Dickey & Pierce

[57] ABSTRACT

A split sprocket with quick locking mechanisms is made of non-metallic components. The split sprocket is coupled to a shaft element by removable wedge members disposed between the sprocket's half members. Key members, in conjunction with set screws, secure the wedge members and prevent the sprocket's half members from tilting about the shaft element. The wedge members maintain a uniform pitch diameter of the sprocket's teeth by preventing contact between the half sprocket members.

14 Claims, 3 Drawing Sheets

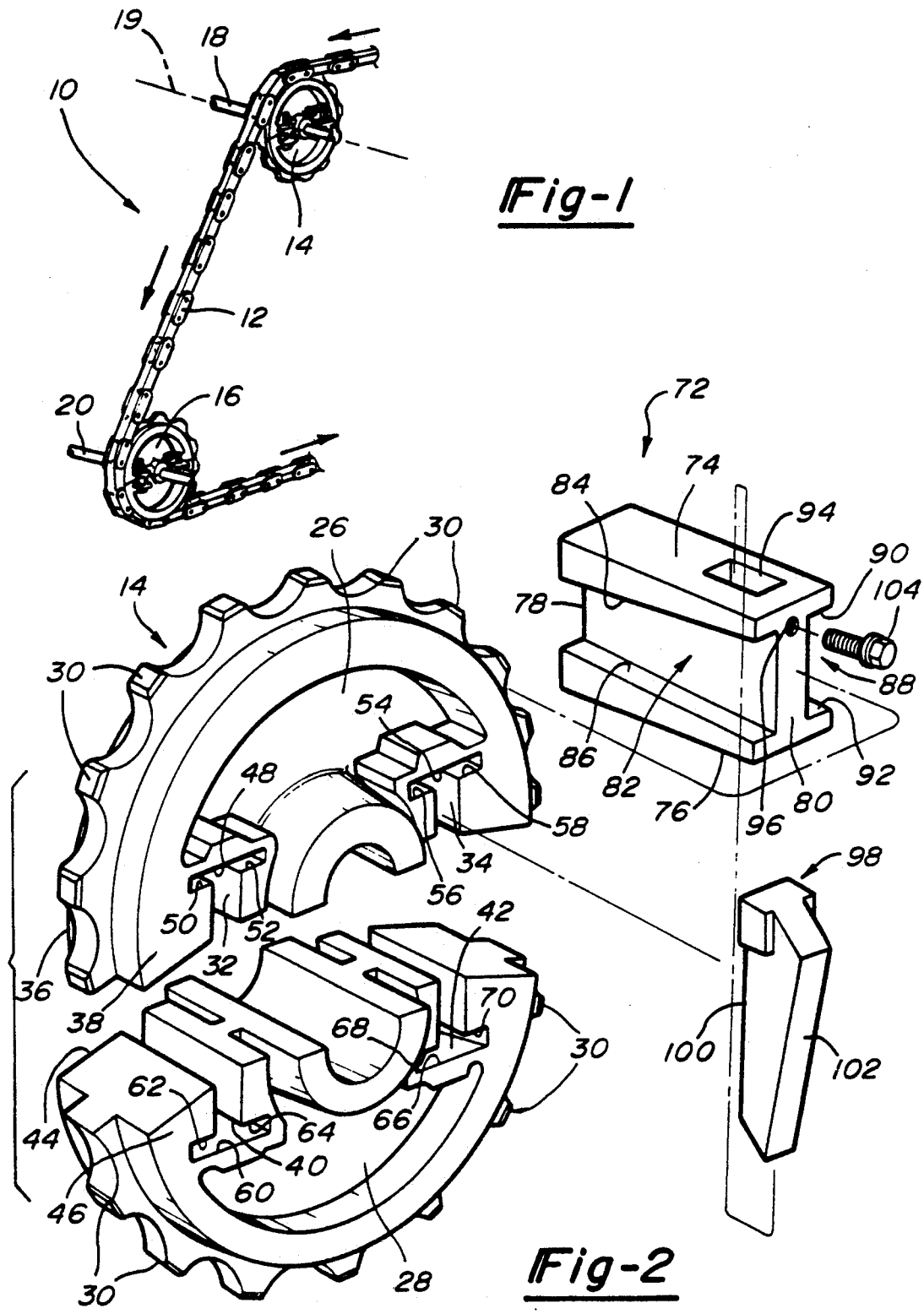

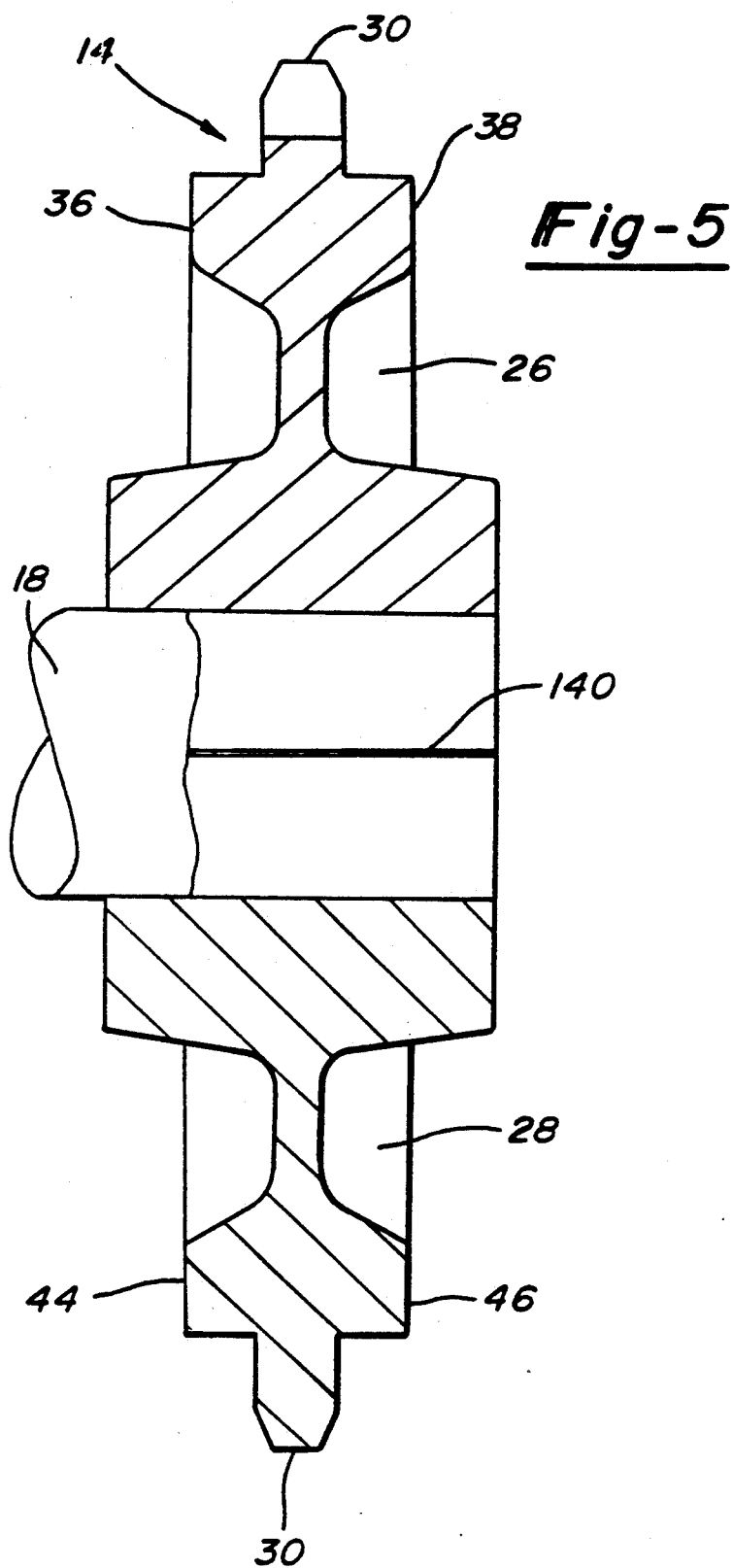

SPLIT SPROCKET WITH QUICK LOCKING MECHANISM

BACKGROUND OF THE INVENTION

1. Technical Field

This invention relates generally to sprockets, and more particularly to split sprockets with quick locking mechanisms for use in a corrosive environment.

2. Discussion of The Related Art

Sprockets are commonly mounted on shaft elements of conveyor systems which are exposed to a variety of environments. Sprockets utilized in destructive conditions, such as in a waste water treatment system's corrosive environment, require periodic maintenance and must be readily removable from the shaft elements upon which they are incorporated. It is well known to use split sprockets in order to facilitate sprocket removal from shaft elements. Examples of split sprockets in the patent literature include U.S. Pat. No. 1,359,822 to Misener, U.S. Pat. No. 2,465,570 to Bocchino, U.S. Pat. No. 3,106,101 to Harriman, and U.S. Pat. No. 4,631,974 to Wiegand et al.

Split sprockets used in a corrosive environment often require the use of complex locking mechanisms, commonly made of expensive stainless steel hardware, for attaching two sprocket half members to a shaft element. Unfortunately, such prior art locking mechanisms increase a sprocket's weight and manufacturing costs, and the sprocket's half members are susceptible to corrosion which inhibits their removal from a shaft element. In addition, the complexity of these locking mechanisms reduces the efficiency at which a split sprocket can be assembled combination of factors reduces the split sprocket's efficiency and increases maintenance costs.

Thus, it would be desirable to produce a split sprocket with reduced weight and increased immunity to the effects from exposure to corrosive environments. Further, it would be desirable to provide a split sprocket with a locking mechanism which eliminates the need for expensive hardware, reduces manufacturing costs, and facilitates the assembly and disassembly of the split sprocket to and from a shaft element.

SUMMARY OF THE INVENTION

Pursuant to the present invention, a split sprocket wheel for mounting on a shaft element and for engaging a conveyor chain is disclosed. The split sprocket wheel incorporates quick locking mechanisms and is preferably comprised of all non-metallic parts both of which reduces weight, increases energy efficiency, and reduces maintenance requirements.

In accordance with the teachings of one embodiment of this invention, a split sprocket wheel is provided for mounting on a shaft and for engaging a conveyor chain. The split sprocket wheel is formed from a pair of half, essentially semi-circular, sprocket members each including radially extending teeth, for engaging the conveyor chain. Openings are positioned on opposite sides of the shaft's axis of rotation. Removable wedge members are disposed through the openings for urging and rigidly securing the half sprocket members around the shaft, forming the split sprocket wheel, while simultaneously maintaining a uniform pitch diameter of the teeth by preventing contact between the half sprocket members.

In the preferred embodiment the wedge members, when disposed in the openings, each have an aperture, perpendicular to the shaft's axis of rotation, for receiving a key member. In addition, each wedge member has a threaded aperture, perpendicular to and extending through to the key member's aperture, for receiving a set screw which makes contact with and secures the key member. Once secured, these key members engage the major faces of the half sprocket members, thereby preventing tilting about the shaft element. The entire split sprocket wheel is preferably comprised of a non-metallic material which reduces the effects of corrosion.

BRIEF DESCRIPTION OF THE DRAWINGS

The various advantages of the present invention will become apparent to those skilled in the art after reading the following specifications and by reference to the drawings in which:

FIG. 1 illustrates a portion a chain conveyor system of the type utilizing the split sprocket wheel of the present invention;

FIG. 2 is an exploded isometric view illustrating the two half sprocket members, one of the wedge members, one of the key members, and one of the set screws making up the split sprocket wheel illustrated in FIG. 1 in accordance with the present invention;

FIG. 5 is a cross-sectional view, taken along lines 5—5 of FIG. 3, illustrating the separation between the half sprocket members in accordance with the present invention.

DETAILED DESCRIPTION OF THE PREFERRED EMBODIMENT

Figure 3:
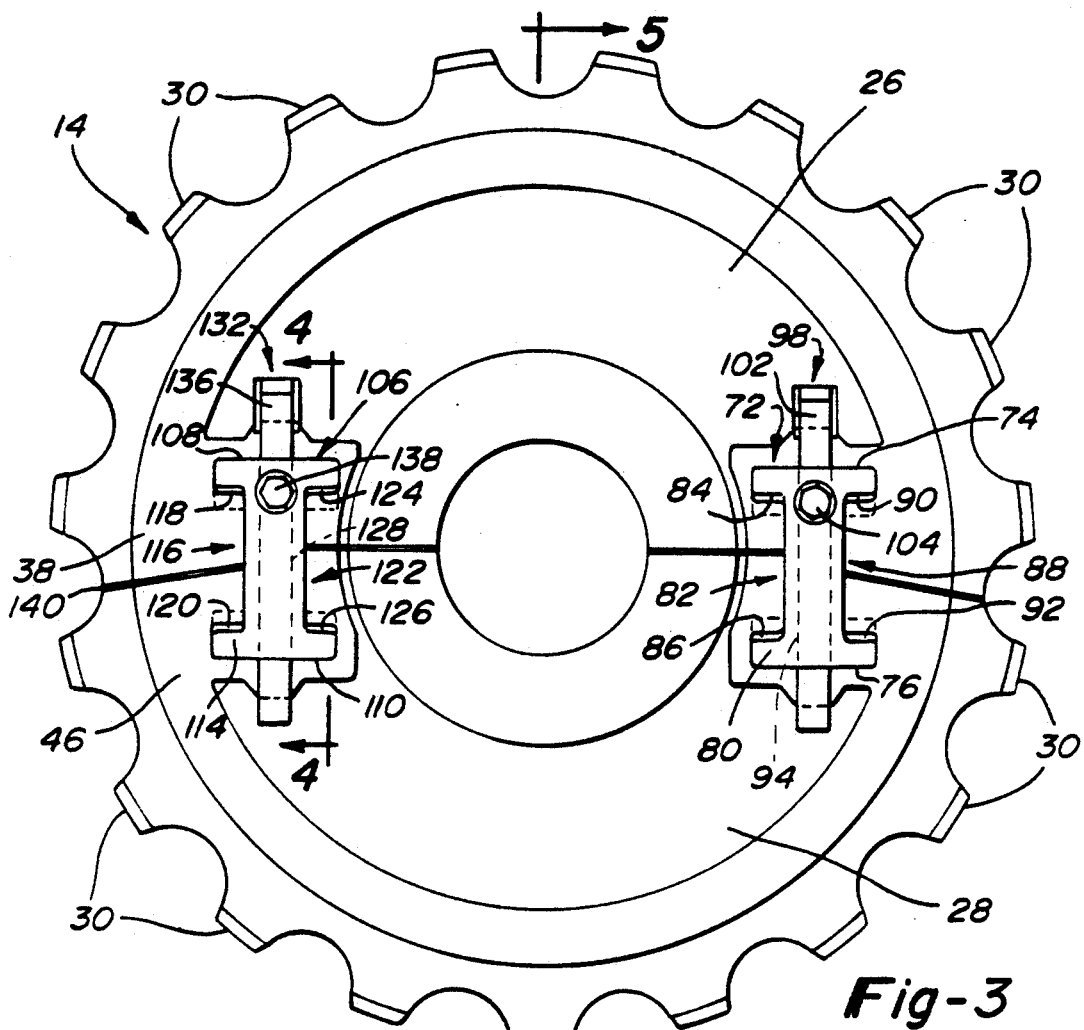
FIG. 3 is a side view of the split sprocket wheel of FIG. 1, illustrating the positioning of the wedge members, key members, and set screws in a locked position in accordance with the present invention.

The following description of the preferred embodiments is merely exemplary in nature and is in no way intended to limit the invention or its application or uses.

The present invention discloses a split sprocket wheel employing half sprocket members which are efficiently assembled around or disassembled from a shaft element and which resist corrosion caused by exposure to corrosive environments. The split sprocket wheel's pair of half, essentially semi-circular, sprocket members are secured around the shaft element and are prevented from making contact with one another by removable wedge members. The wedge members are disposed between the half sprocket members and are secured by key members extending, perpendicular to the shaft's axis of rotation, through apertures in the wedge members. In turn, the key members are secured by set screws. Additionally, the key members abut the major faces of the half sprocket members, thereby preventing tilting about the shaft element. It will be appreciated that producing all of the components of the split sprocket wheel out of plastic components, such as cast Nylon-6, reduces wear, weight, corrosion, and maintenance costs.

First turning to FIG. 1, there is shown a section of a typical conveyor 10 including conveyor chain 12 which engages the radially extending teeth of split sprocket wheels 14 and 16 mounted on shafts 18 and 20, respectively. Wheels 14 and 16 can be either drive sprockets or idler sprockets. If used as a drive sprocket, the shaft would be keyed to the bore of the sprocket to impart rotational movement to it. If used as an idler, the sprocket is left free to rotate about the shaft. In either case, the ends of the shafts can be connected to the walls of a supporting structure by way of bearings or stub shafts (not shown) as disclosed in U.S. Pat. No. 4,645,598 to Hannum, which is hereby incorporated by reference.

FIG. 2 is an exploded isometric view of split sprocket wheel 14 including half, essential semi-circular, sprocket members 26 and 28 each having radially extending teeth 30 for engaging conveyor chain 12. Half sprocket member 26 includes openings 32 and 34, located on opposite sides of the axis of rotation 19 for shaft 18, extending from major face 36 through to major face 38, and half sprocket member 28 includes corresponding openings 40 and 42, located on opposite sides of the axis of rotation 19 for shaft 18, extending from major face 44 through to major face 46. Opening 32 includes flat surface 48, extending perpendicular to faces 36 and 38, and tapered surfaces 50 and 52 tapering, from major face 36 to major face 38, away from split line 140 (see FIG. 3), and opening 34 includes a similar, non-tapered flat surface 54 and tapered surfaces 56 and 58 also tapering away from split line 140, from major face 36 to major face 38. Opening 40 includes flat surface 60 and tapered surfaces 62 and 64 tapering, from major face 44 to major face 46, in a direction opposite than that of tapered surfaces 50 and 52. Opening 42 includes flat surface 66 and tapered surfaces 68 and 70 tapering, from major face 44 to major face 46, in a direction opposite than that of tapered surfaces 56 and 58.

Wedge member 72 includes flat top surface 74, which is parallel to flat bottom surface 76, and perpendicular to flat end surfaces 78 and 80. In accordance with a preferred embodiment, wedge member 72 includes flat side recess 82 defined by tapered edges 84 and 86 which taper in opposite directions from end surface 78 to end surface 80. Similarly, flat side recess 88 is defined by tapered edges 90 and 92 also tapering in opposite directions from end surface 78 to end surface 80. Aperture 94 extends from flat top surface 74 through to flat bottom surface 76 for receiving key member 98. Threaded aperture 96 extends from end surface 80 through to aperture 94 for receiving set screw 104. It should be noted that the directions and degrees of tapering of the tapered surfaces and edges are used by way of example, and other degrees of tapering in different directions are within the scope of the present invention.

Key member 98, including level surface 100 and inclined surface 102, is shaped such that it is capable of being efficiently inserted and removed from aperture 94.

In the preferred embodiment, the components are made of non-metallic material, such as plastic, preferably cast Nylon-6, although they could be made from other rigid materials.

FIG. 3 is a side view of split sprocket wheel 14 illustrating wedge members 72 and 106 in a locked position such that split line 140 is maintained between half sprocket members 26 and 28, thereby maintaining a uniform pitch diameter of teeth 30. Wedge member 106 is identical to wedge member 72 and includes flat top surface 108, parallel to flat bottom surface 110, and flat end surfaces 112 and 114. Side recess 116 is defined by tapered edges 118 and 120 which taper in opposite directions from end surface 112 to end surface 114. Side recess 122 is defined by tapered edges 124 and 126 which taper in opposite directions from end surface 112 to end surface 114. Aperture 128 extends from flat top surface 108 to flat bottom surface 110, in a direction perpendicular to the axis of rotation, for receiving key member 132. Key member 132, including level surface 134 and inclined surface 136, is secured within aperture 128 by set screw 138, which in turn is disposed within threaded aperture 130 which extends from end surface 114 through to aperture 128.

It will be appreciated by one skilled in the art that by inserting wedge member 72 into openings 34 and 42, from major faces 36 and 44 in a direction towards major faces 38 and 46, and inserting wedge member 106 into openings 32 and 40 in the same direction urges half sprocket members 26 and 28 towards one another to form split sprocket wheel 14. During insertion, split line 140 is formed when flat top surfaces 74 and 108 engage flat surfaces 54 and 48 and flat bottom surfaces 76 and 110 engage flat surfaces 66 and 60. It should be noted that the width of split line 140 can be varied by increasing or decreasing the distance between the flat top surfaces and the flat bottom surfaces of the wedge members. When key member 132 is inserted within aperture 128 and key member 98 is inserted within aperture 94, wedge members 106 and 72 are rigidly secured between half sprocket members 26 and 28. Key members 98 and 132 prevent half sprocket members 26 and 28 from tilting about shaft 18 (See FIG. 1). Lastly, set screw 138 secures key member 132 within aperture 128, and set screw 104 secures key member 98 within aperture 94.

Figure 4:
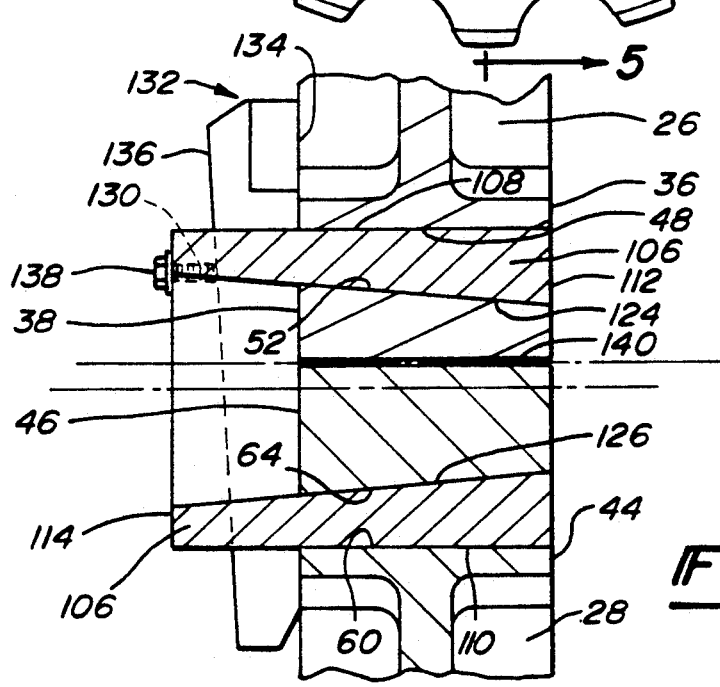
FIG. 4 is a cross-sectional view, taken along lines 4—4 of FIG. 3, in accordance with the present invention.

FIG. 4 is a cross-sectional view along lines 4—4 of FIG. 3 illustrating the positioning of wedge member 106 between half sprocket members 26 and 28. Wedge member 106 is inserted from major faces 36 and 44 through towards major faces 46 and 38. During insertion, tapered surface 52 engages tapered edge 124 and tapered surface 64 engages tapered edge 126. Simultaneously (but not shown), tapered surface 50 engages tapered edge 118 and tapered surface 62 engages tapered edge 120. In the same manner wedge member 72 is coupled between openings 34 and 42, and such coupling of wedge members 72 and 106 urges half sprocket member 26 towards half sprocket member 28. Movement between half sprocket members 26 and 28 stops, prior to contact, when flat top surface 108 engages flat surface 48 and flat bottom surface 110 engages flat surface 60 such that split line 140 exists. Once wedge member 106 is partially inserted between half sprocket members 26 and 28, key member 132 is inserted within aperture 128, from flat top surface 108 through towards flat bottom surface 110. Inclined surface 136 pushes against and wedges wedge member 106 within openings 32 and 40, and level surface 134 abuts major faces 38 and 46 aligning and preventing tilting movements between half sprocket members 26 and 28. Finally, when key member 132 is fully disposed within aperture 128, set screw 138 is disposed within threaded aperture 130 and pushes against key member 132, thereby holding key member 132 within aperture 128. In a similar fashion, wedge member 72 is inserted within openings 34 and 42 and is held in place by key member 98 in conjunction with set screw 104.

FIG. 5 is a cross-sectional view taken along lines 5—5 of FIG. 3 illustrating half sprocket members 26 and 28 in a secured position around shaft element 18. Split line 140 is maintained between half sprocket members 26 and 28 for maintaining a uniform pitch diameter of teeth 30.

From the foregoing it can be seen that the use of wedge members 106 and 72 in conjunction with key members 132 and 98 and set screws 104 and 138, for securing half sprocket members 26 and 28 around a shaft element, have several useful consequences. Compared to prior art split sprockets with steel components, the split sprocket wheel has increased resistance to corrosion, reduced weight, and reduced manufacturing costs. In addition, the use of the wedge members in conjunction with the key members increases the efficiency of assembling and disassembling the half sprocket members to and from a shaft member, prevents tilting movements between the half sprocket members, and maintains a desired pitch diameter of the sprocket wheel's teeth by maintaining the split line.

The foregoing discussion discloses and describes merely exemplary embodiments of the present invention. One skilled in the art will readily recognize from such discussion, and from the accompanying drawings and claims, that various changes, modifications, and variations can be made therein without departing from the spirit and scope of the present invention as defined by the following claims.

What is claimed is:

1. A split sprocket wheel for mounting on a shaft comprising:
   (a) a pair of half, essentially semi-circular, sprocket members, each including:
      (1) a first major face;
      (2) a second opposite major face;
      (3) a plurality of radially extending teeth;
      (4) a pair of openings extending from said first face to said second face and located on opposite sides of an axis of rotation; and
   (b) removable coupling means, disposed through the openings, for urging and rigidly securing said half sprocket members around the shaft to form said sprocket wheel.

2. The sprocket wheel of claim 1 wherein the coupling means prevents contact between the half sprocket members to thereby maintain a uniform pitch diameter of said teeth.

3. The sprocket wheel of claim 1 comprised entirely of molded plastic.

4. The sprocket wheel of claim 2 wherein each of the openings have a flat surface and at least one tapered surface tapering from said first face to said second face.

5. The sprocket wheel of claim 4 wherein said each coupling means, comprises:
   a key member;
   a set screw; and
   a wedge member having a first aperture, perpendicular to the axis of rotation, for receiving said key member and a threaded aperture, perpendicular to and extending through to the first aperture, for receiving said set screw.

6. The sprocket wheel of claim 5 wherein said wedge member further comprises:
   a first end surface;
   a second end surface;
   a flat top surface;
   a flat bottom surface, parallel to said flat top surface, for making contact with one of the flat surfaces of one of said half sprocket members;
   said flat top surface making contact with the corresponding flat surface of the other half sprocket member;
   a pair of tapered side recesses defined by a first tapered edge tapered from the first end surface to the second end surface and a second tapered edge, facing said first tapered edge, tapered, in a direction opposite than that of said first tapered edge, from the first end surface to the second end surface, whereby when said wedge member is inserted into said openings of said half sprocket members, the tapered edges engage said tapered surfaces of the half sprockets to urge said half sprocket members toward one another for securing to the shaft.

7. The sprocket wheel of claim 5 wherein said key member, comprises:
   a level surface; and
   an inclined surface, whereby when said key member is inserted into the first aperture, said inclined surface pushes against said wedge member, firmly wedging and locking said wedge member into said openings, and wherein said level surface abuts said second major faces of said half sprocket members preventing tilting of said half sprocket members.

8. The sprocket wheel of claim 5 wherein said set screw, disposed within the threaded aperture, pushes against said key member holding said key member within said first aperture.

9. A split sprocket wheel for mounting on a shaft and for engaging a conveyor chain, comprising:
   (a) a pair of half, essentially semi-circular, sprocket members, each including:
      (1) a first major face;
      (2) a second opposite major face;
      (3) a plurality of radially extending teeth for engaging said chain;
      (4) a pair of openings extending from said first face to said second face and located on opposite sides of an axis of rotation;
   (b) a key member;
   (c) a set screw;
   (d) a wedge member, disposed through the openings, for urging and rigidly securing said half sprocket members around the shaft to form said sprocket wheel having a first aperture, perpendicular to the axis of rotation, for receiving said key member and a threaded aperture, perpendicular to and extending through to the first aperture, for receiving said set screw.

10. The sprocket wheel of claim 9 comprised entirely of molded plastic.

11. The sprocket wheel of claim 9 wherein each of the openings have a flat surface and at least one tapered surface tapering from said first face to said second face.

12. The sprocket wheel of claim 11 wherein said wedge member further comprises:
   a first end surface;
   a second end surface;
   a flat top surface;
   a flat bottom surface, parallel to said flat top surface, for making contact with one of the flat surfaces of one of said half sprocket members;
   said flat top surface making contact with the corresponding flat surface of the other half sprocket member;
   a pair of tapered side recesses defined by a first tapered edge tapered from the first end surface to the second end surface and a second tapered edge, facing said first tapered edge, tapered, in a direction opposite than that of said first tapered edge, from the first end surface to the second end surface, whereby when said wedge member is inserted into said openings of said half sprocket members, the tapered edges engage said tapered surfaces of the half sprockets to urge said half sprocket members toward one another for securing to the shaft.

13. The sprocket wheel of claim 9 wherein said key member, comprises:
   a level surface; and
   an inclined surface, whereby when said key member is inserted into the first aperture, said inclined surface pushes against said wedge member, firmly wedging and locking said wedge member into said openings, and wherein said level surface abuts said second major faces of said half sprocket members preventing tilting of said half sprocket members.

14. The sprocket wheel of claim 9 wherein said set screws, disposed within the threaded aperture, pushes against said key member holding said key member within said first aperture.

* * * * *